(12) United States Patent
Das Sharma

(10) Patent No.: US 11,561,910 B2
(45) Date of Patent: Jan. 24, 2023

(54) IN-BAND RETIMER REGISTER ACCESS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 15/942,160

(22) Filed: Mar. 30, 2018

(65) Prior Publication Data

US 2018/0225233 A1 Aug. 9, 2018

Related U.S. Application Data

(63) Continuation of application No. 15/198,605, filed on Jun. 30, 2016, now abandoned.

(60) Provisional application No. 62/310,932, filed on Mar. 21, 2016.

(51) Int. Cl.
*G06F 13/16* (2006.01)
*G06F 13/42* (2006.01)
*G06F 11/10* (2006.01)

(52) U.S. Cl.
CPC ...... *G06F 13/1642* (2013.01); *G06F 11/1004* (2013.01); *G06F 13/4286* (2013.01)

(58) Field of Classification Search
None
See application file for complete search history.

(56) References Cited

U.S. PATENT DOCUMENTS 4,284,843 A * 8/1981 White .................. H04L 1/0083
178/69 G
5,252,961 A * 10/1993 Yamauchi ............... H04B 3/36
370/243
5,446,924 A * 8/1995 Christian ............ H04W 84/022
455/508
5,640,393 A * 6/1997 Lo ......................... H04L 12/44
713/153

(Continued)

FOREIGN PATENT DOCUMENTS

KR 101593029 B1 2/2016
WO 2015099733 A1 7/2015
WO 2017165056 A1 9/2017

OTHER PUBLICATIONS

Zhang et al., Multi-frequency PLC Networking Technology Based on Preamble Sequence, IEEE, Conference Paper, Pertinent pp. 552-555 (Year: 2015).*

(Continued)

*Primary Examiner* — April Y Blair
*Assistant Examiner* — Dipakkumar B Gandhi
(74) *Attorney, Agent, or Firm* — Alliance IP, LLC

(57) ABSTRACT

Data is accessed from a particular register first device that is connected to a second device via a link that includes at least one retimer device. The particular register corresponds to requests to be sent in in-band transactions with the retimer, and the data corresponds to a particular transaction with the retimer. At least one ordered set is generated at the first device to comprise a subset of bits encoded with the data, where the ordered set with the encoded subset of bits is to be sent on the link and the subset of bits are to be processed by the retimer in the particular transaction.

31 Claims, 14 Drawing Sheets

(56) References Cited

U.S. PATENT DOCUMENTS

| | | | | |
|---|---|---|---|---|
| 5,875,210 | A * | 2/1999 | Brief | H04L 12/46 |
| | | | | 375/211 |
| 6,031,821 | A * | 2/2000 | Kalkunte | H04L 47/10 |
| | | | | 370/235 |
| 6,430,225 | B1 | 8/2002 | Okawa et al. | |
| 6,442,170 | B1 * | 8/2002 | Perlman | H04L 49/351 |
| | | | | 370/315 |
| 6,509,988 | B1 * | 1/2003 | Saito | H04B 10/40 |
| | | | | 398/47 |
| 7,539,134 | B1 * | 5/2009 | Bowes | H04L 1/0072 |
| | | | | 370/230 |
| 2002/0031101 | A1 * | 3/2002 | Petite | G01D 4/004 |
| | | | | 370/310 |
| 2003/0005207 | A1 | 1/2003 | Langendorf et al. | |
| 2003/0070027 | A1 * | 4/2003 | Ng | G06F 13/4086 |
| | | | | 710/305 |
| 2007/0139214 | A1 * | 6/2007 | Andersen | G08C 17/02 |
| | | | | 340/12.29 |
| 2009/0011701 | A1 * | 1/2009 | Yang | H04W 56/001 |
| | | | | 455/7 |
| 2009/0013210 | A1 * | 1/2009 | McIntosh | H04L 41/0672 |
| | | | | 714/4.1 |
| 2012/0079162 | A1 * | 3/2012 | Jaramillo | G09G 5/006 |
| | | | | 710/316 |
| 2013/0111083 | A1 * | 5/2013 | Wu | G06F 13/4291 |
| | | | | 710/52 |
| 2014/0241411 | A1 * | 8/2014 | Ghiasi | H04L 25/4904 |
| | | | | 375/231 |
| 2015/0180507 | A1 | 6/2015 | Willey et al. | |
| 2015/0244632 | A1 * | 8/2015 | Katar | H04L 47/2433 |
| | | | | 370/230 |
| 2015/0261718 | A1 * | 9/2015 | Campbell | G06F 13/4081 |
| | | | | 710/302 |
| 2016/0147606 | A1 * | 5/2016 | Arroyo | G06F 11/221 |
| | | | | 714/5.11 |

OTHER PUBLICATIONS

"Extension Devices," Intel et al., PCI-SIG specifications, pp. 1-38, Oct. 6, 2014; retrieved May 31, 2017 from https://pcisig.com/specifications/pciexpress/specifications/ECN_Atomic_Ops_080417.pdf> (Year: 2014).*

Areal et al., Analysis of a time-lens based optical frame synchronizer and retimer for 10G Ethernet aiming at a Tb/s optical router/switch design, IEEE, Conference Paper, pp. 1-5 (Year: 2010).*

"Extension Devices," Intel et al., PCI-SIG specifications, pp. 1-38, Oct. 6, 2014; retrieved May 31, 2017 from https://pcisig.com/specifications/pciexpress/specifications/ECN_Atomic_Ops_080417.pdf>.

"High-speed Serial Bus Repeater Primer, Re-driverand Re-timer Micro-architecture, Properties, and Usage", Intel White paper, revision 1.2, Oct. 2015; Retrieved Jun. 27, 2017, from , 72 pages.

International Search Report and Written Opinion in International Application No. PCT/US2017/018977 dated May 24, 2017, 18 pgs.

International Preliminary Report on Patentability in International Application No. PCT/US2017/018977 dated Sep. 25, 2018, 16 pgs.

PCI Express, "PCI Express Base Specification Revision 3.0," Nov. 10, 2010; 204 pages.

Taiwan Patent Office; Search Report and Office Action issued in TW Patent Application No. 106103961, dated Dec. 15, 2020; 10 pages including partial English translation.

Taiwan Patent Office; Official Communication with Search Report issued in Patent Application No. TW 106103961, dated Apr. 19, 2021; 15 pages including English summary.

* cited by examiner

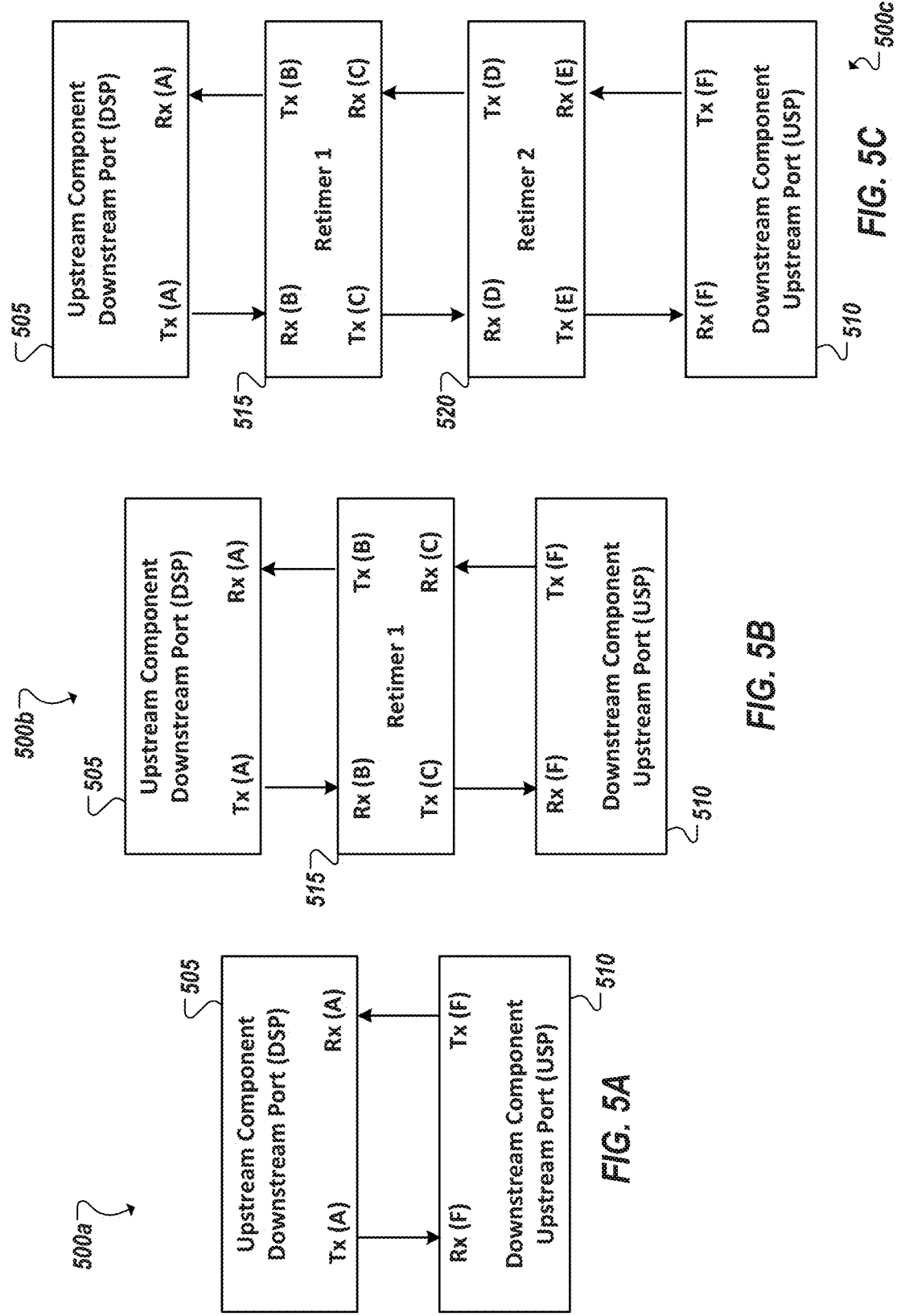

| Symbol | DSP -> USP | USP -> DSP |
|---|---|---|
| 4N | SKP_CSR (0x78) => Indicates this carries CSR access | SKP_CSR (0x78) => Indicates this carries CSR access |
| 4N+1 | Bit 7: Parity | Bit 7: Parity |
| | Bit [6:0]: CSR Access [6:0] | Bit [6:0]: CSR Access Return [6:0] |
| 4N+2 | Bit 7: Retimer 1 DSP error status | Bit 7: Retimer 2 USP error status |
| | Bit [6:0]: CSR Access [13:7] | Bit [6:0]: CSR Access Return [13:7] |
| 4N+3 | Bit 7: Retimer 2 DSP error status | Bit 7: Retimer 1 USP error status |
| | Bit [6:0]: CSR Access [20:14] | Bit [6:0]: CSR Access Return [20:14] |

FIG. 10

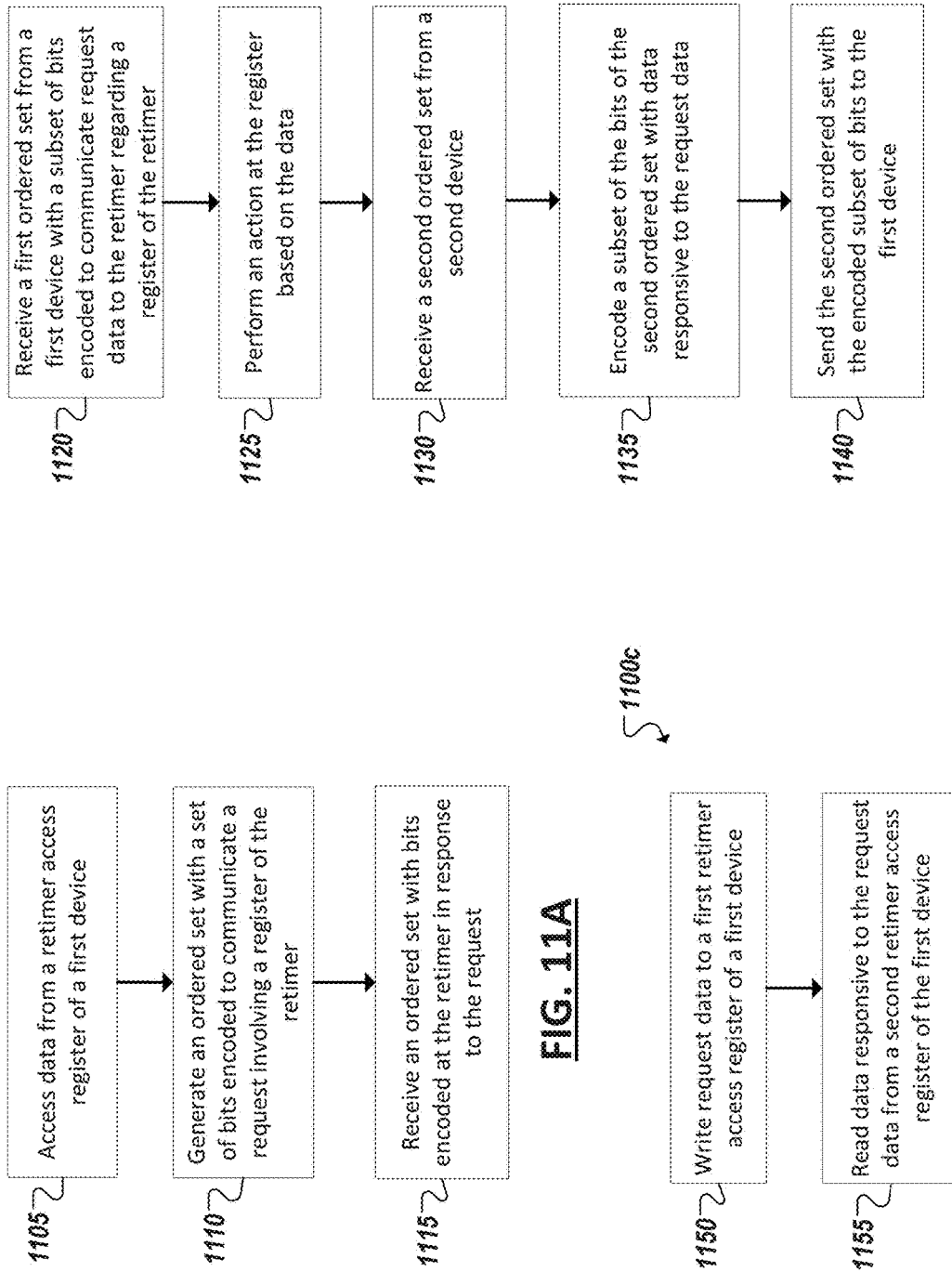

IN-BAND RETIMER REGISTER ACCESS

This Application is a continuation of U.S. application Ser. No. 15/198,605, filed on Jun. 30, 2016 and entitled IN-BAND RETIMER REGISTER ACCESS, which application claims the benefit of priority to U.S. Provisional Patent Application Ser. No. 62/310,932 filed on Mar. 21, 2016 and entitled IN-BAND RE-TIMER REGISTER ACCESS. The disclosures of these related prior applications are considered part of and are hereby incorporated by reference in their entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 5A-5C illustrate simplified block diagrams of example implementations of a test mode for determining errors in one or more sublinks of a link.

FIG. 10 illustrates a simplified block diagram of an example enhanced training sequence.

FIGS. 11A-11C are flowcharts illustrating example techniques in connection with utilizing registers of a retimer.

DETAILED DESCRIPTION

Figure 1:
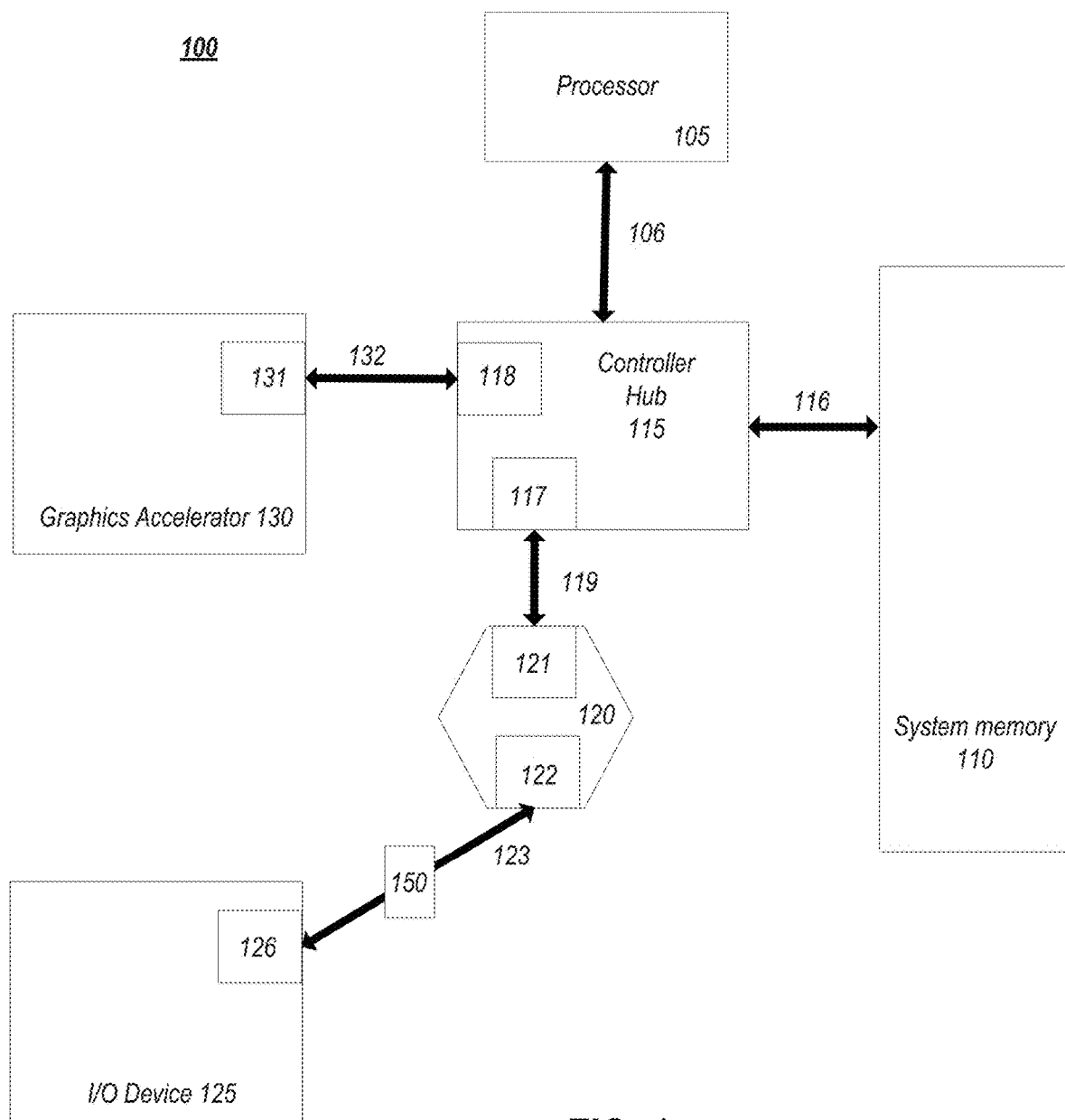
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot—Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
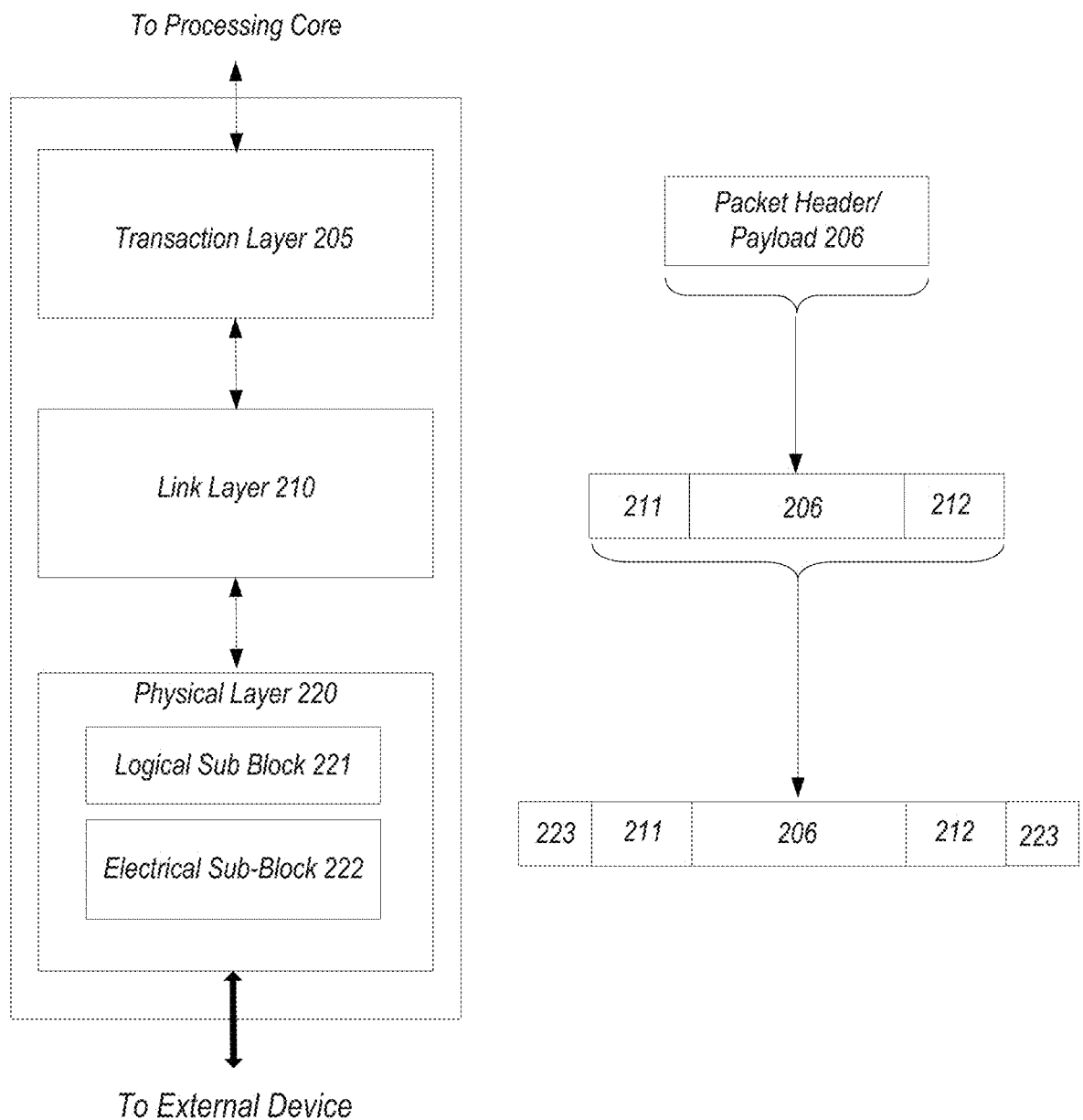
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
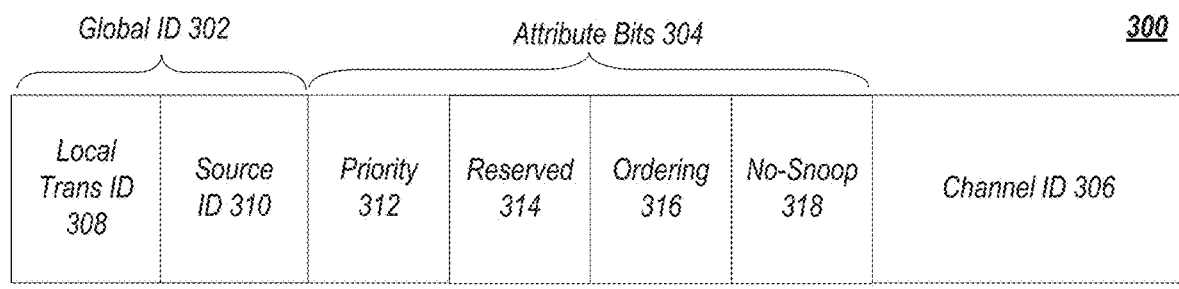
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is deserialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
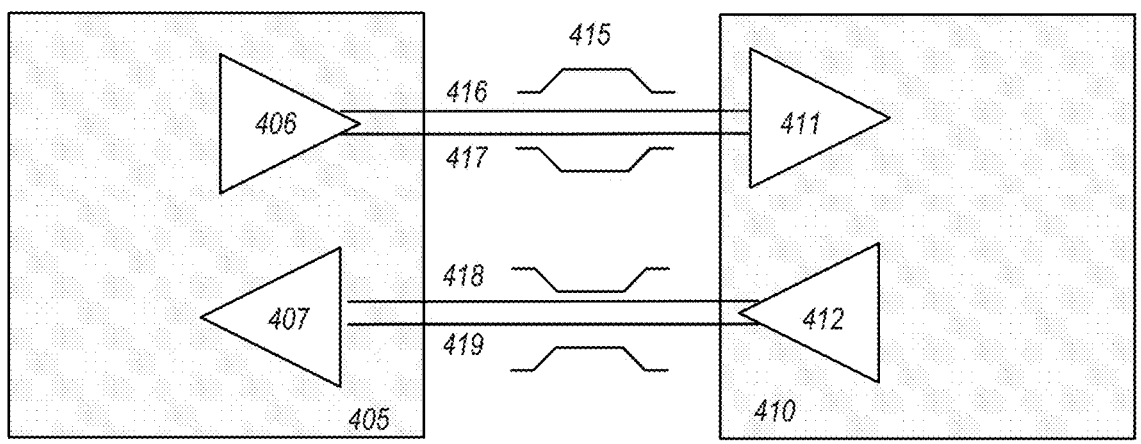
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a link, such as a PCIe-compliant link, can include one or more retimers or other extension devices, such as a repeater. A retimer device (or simply "retimer"), can include active electronic devices that receive and re-transmit (retime) digital I/O signals. Re-timers can be used to extend the length of a channel that can be used with a digital I/O bus. Retimers can be protocol aware, software transparent, and capable of executing a link equalization procedure, such as the link equalization procedure of PCIe.

FIGS. 5A-5C are simplified block diagrams 500a-c illustrating example implementations of a link interconnecting two system components, or devices, such as upstream component 505 and downstream component 510. An upstream component 505 and downstream component 510 can be connected directly, in some instances, with no retimers, redrivers, or repeaters disposed on the link between the two components 505, 510, such as shown in the example of FIG. 5A. In other instances, a retimer (e.g., 515) can be provided to extend the link connecting upstream component 505 and downstream component 510, such as illustrated in FIG. 5B. In still other implementations, two or more retimers (e.g., 515, 520) can be provided in series to further extend a link connecting upstream component 505 and downstream component 510. For instance, a particular interconnect technology or protocol may specify a maximum channel length and one or more retimers (e.g., 515, 520), can be provided to extend the physical length of the channel connecting two devices 505, 510. For instance, providing retimers 515, 520 between upstream component 505 and downstream component 510 can allow a link three times the maximum length specified for a link without these retimers e.g., 515, 520, among other example implementations.

Figures 6A, 6B:
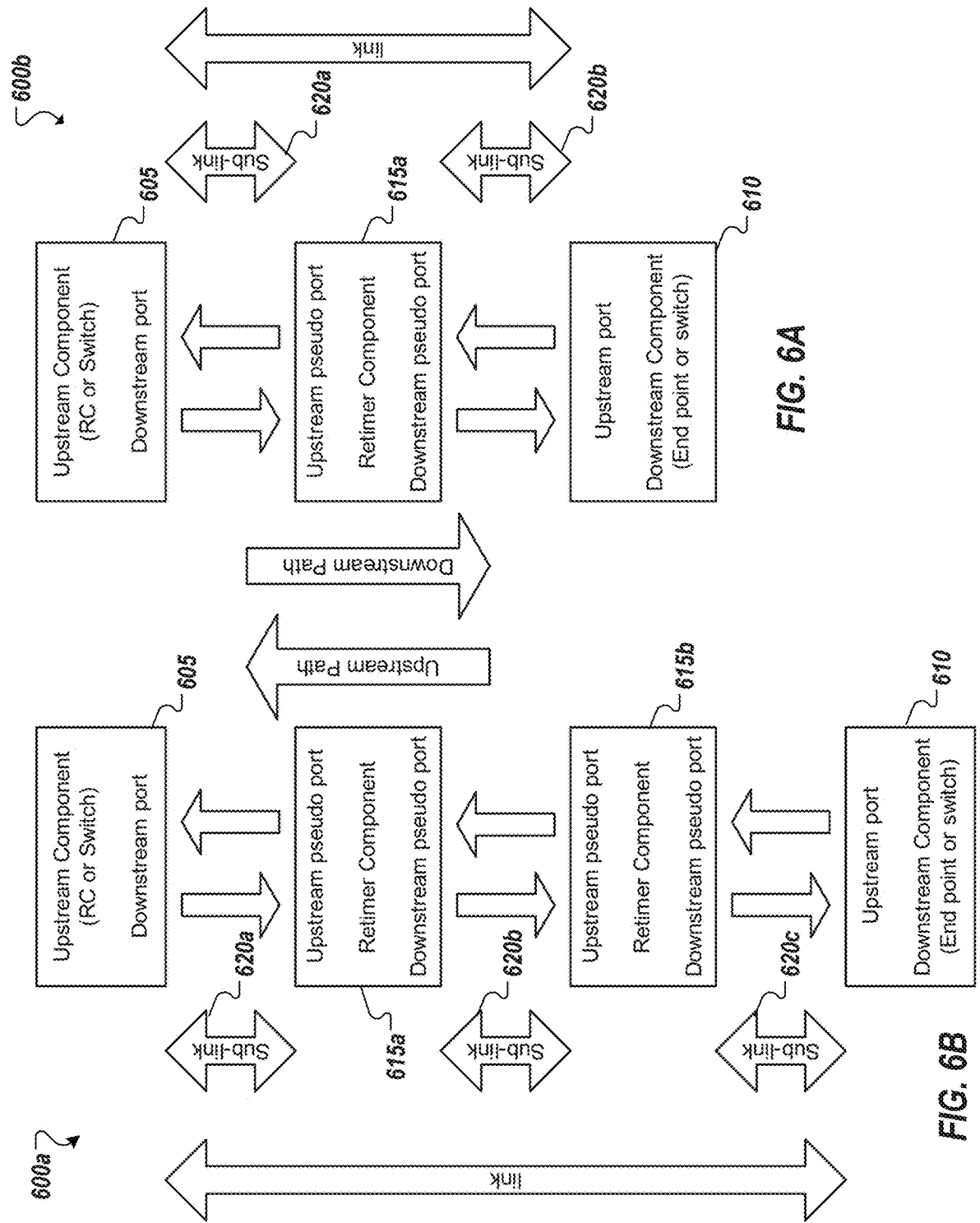
FIGS. 6A-6B illustrate simplified block diagrams of example links including one or more extension devices.

A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 6A-6B illustrate simplified block diagrams 600a-b of example links including one or more retimers. For instance, in FIG. 6A, a link connecting a first component 605 (e.g., an upstream component) to a second component 610 (e.g., a downstream component) can include a single retimer 615a. A first sublink 620a can connect the first component 605 to the retimer 615a and a second sublink 620b can connect the retimer 615a to the second component. As shown in FIG. 6B, multiple retimers 615a, 615b can be utilized to extend a link. Three sublinks 620a-c can be defined through the two retimers 615a, 615b, with a first sublink 615a connecting the first component to the first retimer 615a, a second sublink connecting the first retimer 615a to the second retimer 615b, and the third sublink 615c connecting the second retimer 615b to the second component.

As shown in the examples of FIGS. 6A-6B, in some implementations, a retimer can include two pseudo ports, and the pseudo ports can determine their respective downstream/upstream orientation dynamically. Each retimer 615a, 615b can have an upstream path and a downstream path. Further, retimers 615a, 615b can support operating modes including a forwarding mode and an executing mode. A retimer 615a, 615b in some instances can decode data received on the sub-link and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

Figure 7:
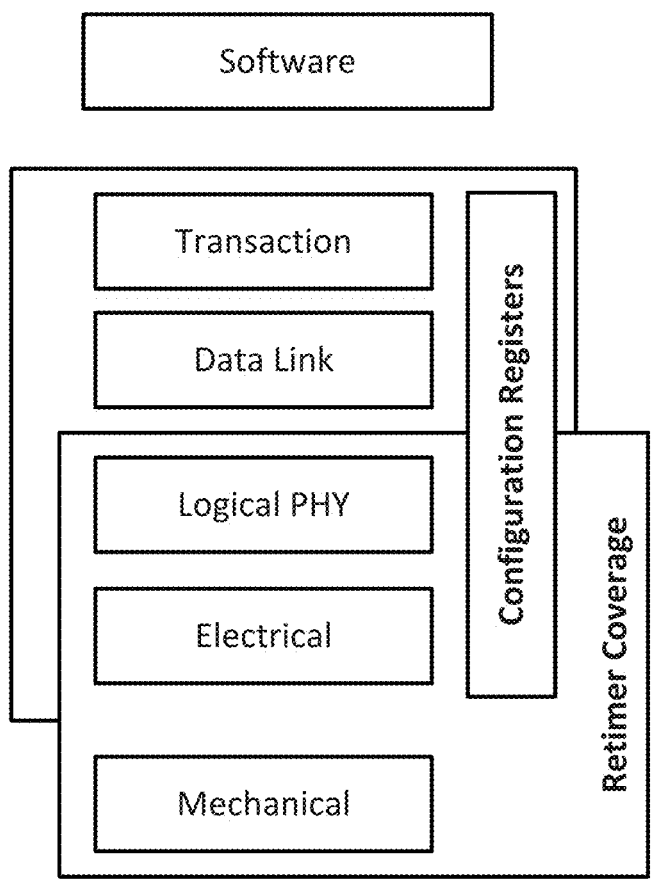
FIG. 7 illustrates a simplified block diagram of an example implementation of a retimer with enhanced physical layer logic.

As data rates of serial interconnects (e.g., PCIe, UPI, USB, etc.) increase, re-timers are increasingly used to extend the channel reach. Re-timers may capture the received bit stream prior to regenerating and re-transmitting the bit stream. In some cases, retimers may be protocol-aware and possess a full physical layer and participate in the link negotiation (LTSSM), including transmitter / receiver equalization, such as shown in FIG. 7. Such retimer functionality can helps each re-timer increase the channel length by the maximum allowed by the underlying specification. Multiple re-timers can be cascaded for even longer channel reach.

As further illustrated in FIG. 7, in some implementations, retimers may lack link, transaction, and software layers. Accordingly, while a retimer may include various registers, including registers that may be used to enhance configuration of the link such as power state management, tuning the circuits for better performance/power, ability to report errors, etc., these retimer registers may be inaccessible using an architected in-band mechanism. Instead, traditional approaches define a system- or retimer-specific sideband mechanism to access and utilize retimer registers. A "register" may refer to any mechanism to control the behavior of the re-timer or to obtain the status information, among other examples. Such sideband solutions, however, may be very limited in their applicability and be incompatible with existing form-factors (e.g., CEM, cables) which do not have a common architected side-band access mechanism. Consequently, adding a sideband mechanism can mean significant platform changes and investment to accommodate new form factors. Further, the lack of an architected register access mechanism may preclude an interconnect architecture from defining an architected set of registers for a re-timer (e.g., there's no reason to architect a set of registers without a suitable access mechanism). Consequently, many platforms adopt proprietary sideband access mechanisms specific to each retimer vendor they use.

An implementation can be provided that addresses at least some of the example issues above, among others. For instance, in one example, an in-band mechanism can be defined using only the physical layer to access the configuration registers in the re-timers, such as represented in the simplified block diagram shown in FIG. 7. In-band retimer register access can be used to architect and perform in-band access in existing platform form-factors and can be adapted for potentially any serial interconnect technology.

In one example implementation, in-band retimer register access can be facilitated by enhancing training sequences (TSes) generated by the physical layer to allow communications to be embedded within these TSes for processing by the retimer(s). To facilitate this enhanced data communication with retimers, one or more registers can additionally be provided in one of the (upstream or downstream) components having access to the full stack. Many serial interconnects utilize training sequences that are sent periodically, even in active states (i.e., non-link training link states (e.g., L0)), such as SKP Ordered Sets in PCIe and USB, L0c flits in UPI, among other examples. Reserved or underused fields or bits within a particular one of the training sequences defined in an interconnect protocol can be designated for optionally encoding information (e.g., addresses, commands, data, etc.) within the training sequence for consumption and use by the retimer. Accordingly, existing training sequences can be leveraged to provide in-band retimer register access. In the absence of a suitable training sequence defined within an interconnect protocol, a new training sequence can be defined that is to be sent according to a suitable frequency for use in messaging a retimer to read or write data to a retimer register in a link.

In some implementations, physical layer training sequences may lack protections (e.g., error detection, retry, etc.) that would be customary for higher layer traffic and be desirable for messages that may read or write data from/to registers of one or more retimers of a link. In one implementation, bits of a training sequence can be designated as a payload for use in communicating with a retimer. This payload can further include an error detection code, such as a cyclic redundancy check (CRC) value. Accordingly, a retimer can be enhanced with logic for detecting bit errors (in the in-band retimer register read/write messages) from the error detection code. In one implementation, as will be described in more detail below, instead of having a retry, a handshake protocol can be defined between the components and the retimer using the enhanced training sequence (e.g., an ordered set (OS)), where a component sends commands and the target retimer sends back responses to complete the handshake.

Figure 8:
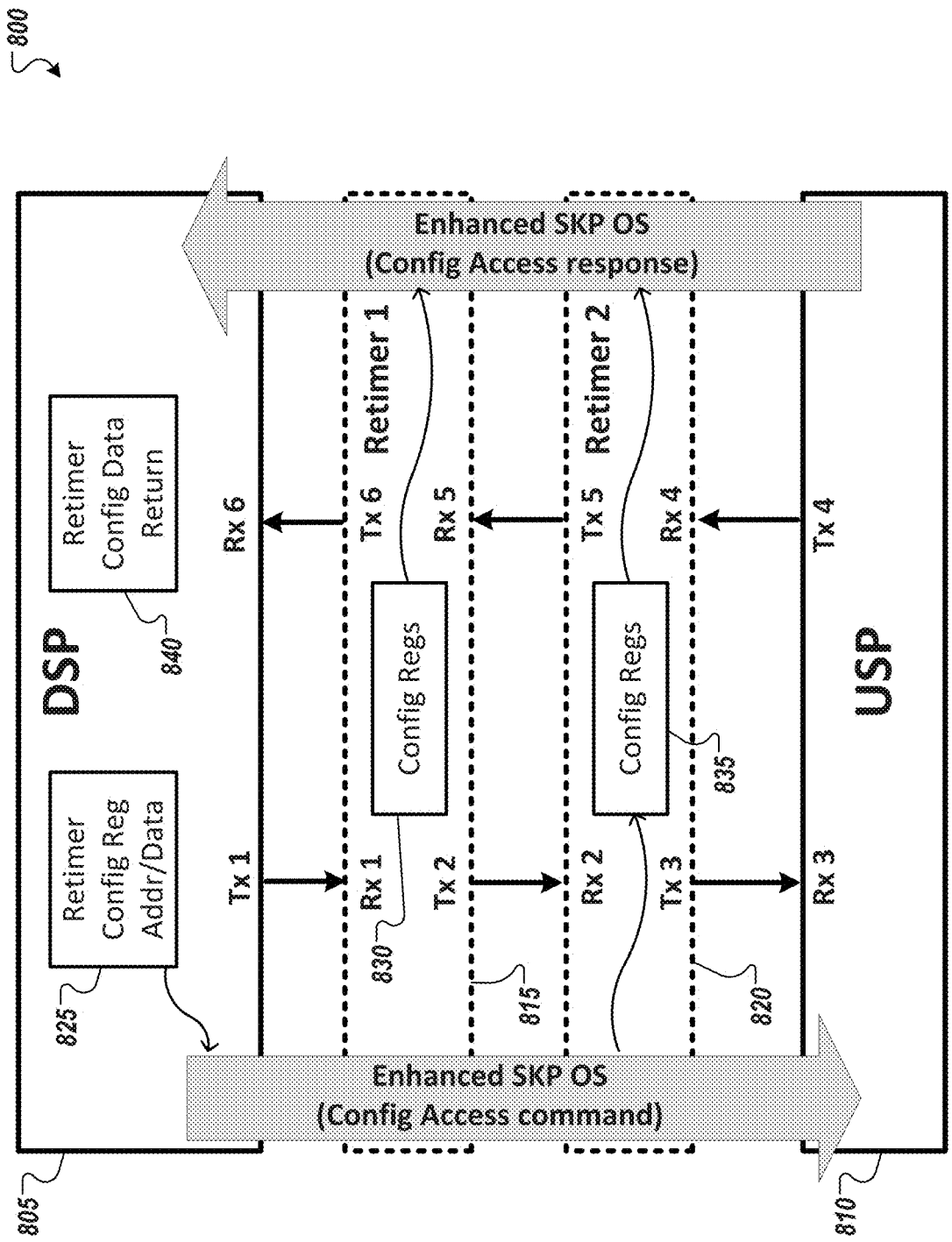
FIG. 8 is a simplified block diagram illustrating an example use of an enhanced training sequence to access registers of one or more retimers.

As an illustrative example, an ordered set data sequence (e.g., a PCIe-defined ordered set) may be enhanced to carry in-band data relating to and facilitating access to retimer registers. Similar principles can be applied to other training sequences defined in other interconnect protocols. As shown in FIG. 8, a downstream port 805 of a first component can be coupled to an upstream port 810 of a second component by a link that is extended by two retimers 815, 820. In this example, the downstream port 805 can be provided with a retimer configuration register address/data register 825 to hold data to be sent in a configuration access command to one of the two retimers using fields of an enhanced SKP OS. One or more bits of the SKP OS can include a command code, data, or an address for use at a configuration register (e.g., 830, 835) of a retimer (e.g., 815, 820) to read or write data from/to the register 830, 835. Retimers can respond to configuration access commands sent by encoding data in an instance of an enhanced SKP OS by itself encoding response data in a subsequent instance of an enhanced SKP OS. Data encoded by the retimer (e.g., 815, 820) may be extracted at the downstream port and recorded in a retimer configuration data return register (e.g., 840). The registers (e.g., 825, 840) maintained at the downstream device can be written to and read from by system software and/or other components of the system allowing (indirect) access to the retimer registers: one register (e.g., 825) conveying the address/data/command to the retimer and a second register (e.g., 840) that stores the responses coming back from the re-timer. In other implementations, such registers (e.g., 825, 840) can be maintained at the upstream port 810 instead of or in addition to the registers being maintained at the downstream port 805, among other examples.

Continuing with the example of FIG. 8, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/ Data" (e.g., 825) to the re-timers and carrying the responses from the re-timers back to load to "Retimer Config Data Return" (e.g., 840), with some bits allotted for CRC for the protection of data. For example, in PCIe this can include enhancing the existing SKP Ordered Set, as shown in FIG. 10 (e.g., with new CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

Figure 9:
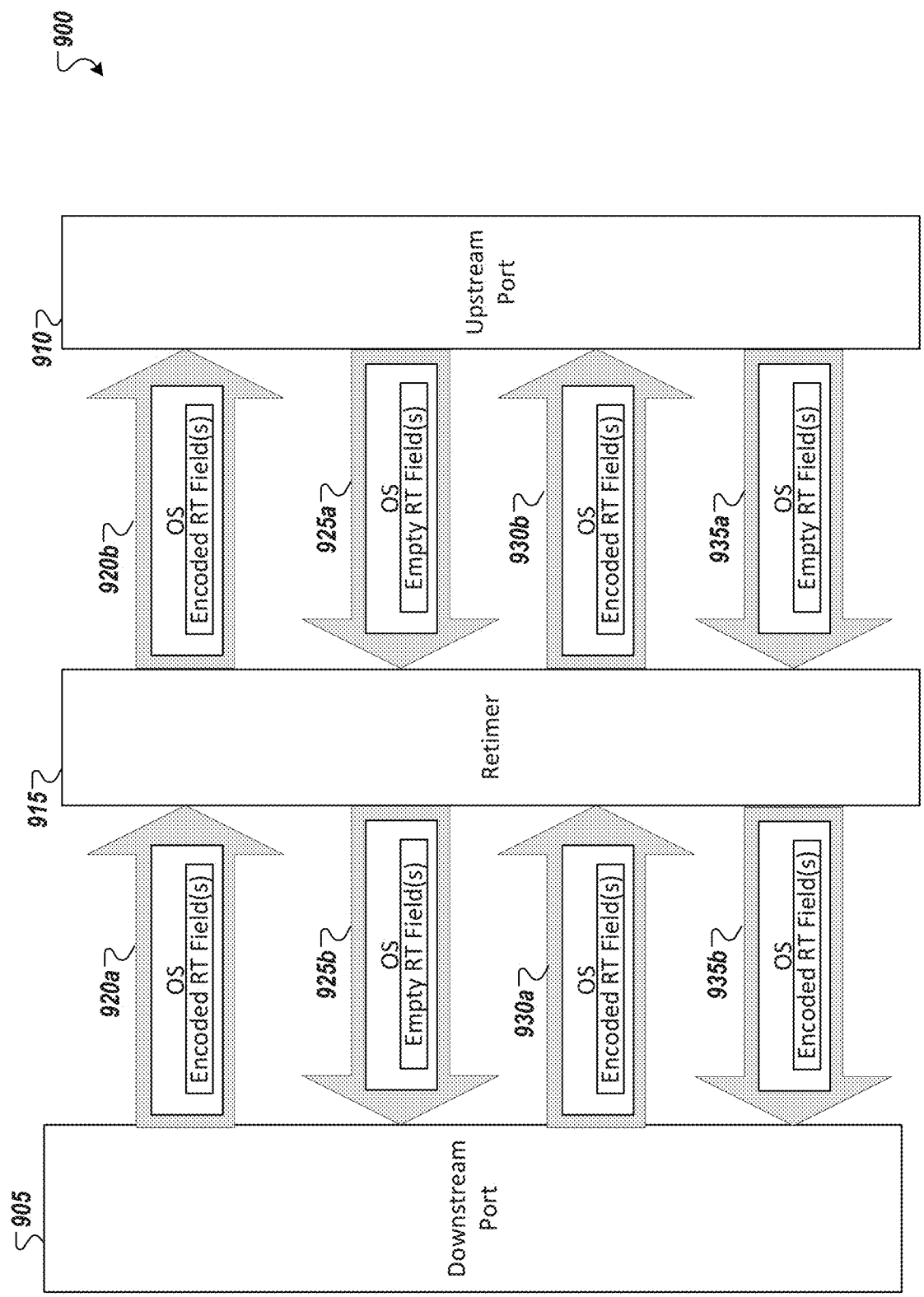
FIG. 9 is a simplified block diagram illustrating an example use of an enhanced training sequence to access registers of one or more retimers.

FIG. 9 shows a simplified block diagram illustrating an example handshake involving an enhanced ordered set used to communicate commands to a retimer 915 in-band to access registers of the retimer 915. A downstream port 905 can send a first instance 920a of an enhanced ordered set (OS) encoded with data within designated retimer register access bits of the enhanced OS. The OS 920a is received at the retimer 915 and regenerated for transmission (as 920b) to the upstream port 910. In some cases, the data encoded within the retimer register access bits of the OS 920b may be ignored by the upstream port 910. After a duration of time, the upstream port 910 can generate an instance 925a of an enhanced OS for transmission to the downstream port 905 over retimer 915. As sent from the upstream port, the retimer register access bits designated within the OS 925a may be left empty (or may be encoded with some other value). In this example, the retimer 915 may not generate a response to the command included in the retimer register access bits of OS instance 920a. For instance, a CRC error or other issue may result in no response being generated by the retimer. Accordingly, the retimer 915 may simply regenerate the OS 925a as received from the upstream port 910 and forward the regenerated OS (with the retimer register access bits left empty) to the downstream port (at 925b). In such a case, the downstream port may interpret the non-responsive OS 925b as an indication that a bit error or other error prevented the retimer 915 from responding appropriately to the transaction included in the encoded retimer fields of OS 920a. Accordingly, in one example, the downstream may retry a retimer register command until a response is received. In some cases, a retimer register request register at the downstream port 905 (e.g., a Retimer Config Reg Addr/Data register) may queue requests, with each request being sent as a preceding request is the queue is responded to by the retimer. In some alternative implementations, new requests may be sent to a retimer (e.g., using immediately subsequent instances of an enhanced OS) with each request designated by a request identifier (which may be identified in corresponding responses generated by the retimer 915).

Continuing with the example of FIG. 9, when the downstream port 905 receives a non-responsive instance of an enhanced OS (e.g., 925b) subsequent to its request 920a, it may use the next scheduled outbound enhanced OS instance (e.g., 930a) to re-encode data from its retimer register request register and effectively resend the request in 920a in a next instance of an enhanced OS (e.g., 930a). In this example, the retimer may receive the enhanced OS 930a and decode the bits in the retimer register access bits of the OS 930a to generate response data to be sent in a next upstream-to-downstream OS (e.g., 935a). The retimer 915 nonetheless may regenerate the received OS 930a for transmission to the upstream port (as 930b), as the OS may include additional information not related to the retimer registers for processing by the upstream port and its corresponding component. The upstream port may send a next-scheduled enhanced OS instance 935a. The retimer 915, upon receiving the next downstream-port-bound OS, may regenerate the OS by encoding its response data within the retimer register access/response bits of the enhanced OS and send the encoded OS instance 935b to the downstream port 905. The encoded OS instance 935b can complete a handshake between the requesting downstream port 905 and retimer 915. The downstream port can then move on to any subsequent requests of the retimer 915 and write the response data to a retimer response register (e.g., a Retimer Config Data Return register) at the downstream port. 905 System software, or another component, can then access the retimer response register to effectively access one or more registers of the retimer.

In a particular example of a modified PCIe SKP OS, such as illustrated in FIG. 10, 21 bits of the CSR Access and CSR Access Return bits can be provided. In one example, system software may write the command, the re-timer number, and address to the "Retimer Reg Addr/Data" register in the a port of a component (e.g., a downstream port (DSP)). In some cases, information can be sent to a retimer in multiple steps (i.e., multiple OSes). For example, a configuration write of 32 bits involving a configuration address space of 16 bits, three OSes can be sent: one for sending the address, and two to send the data. The Enhanced SKP Ordered Set can be sent corresponding to the field in "Retimer Reg Addr/Data" with appropriate CRC. The port (e.g., DSP) continues to send whatever is in the register. In an alternate approach, the command can be sent a fixed number of times after which the "Retimer Reg Addr/Data" contents can be automatically discarded or even discarded after receiving a successful response from the re-timer. On receiving the command from the enhanced SKP OS, the retimer may register the command it received if it is the intended recipient and the CRC is correct and schedule a corresponding response. For responses to writes, one can have some fields of the response send a signature of the data received for additional protection. For reads, the data field may carry the information requested. If the received commands have errors, it can send back an error response. The receiving port (e.g., DSP) may register responses it gets in the Enhanced SKP OS from the retimer if the CRC passes in the "Retimer Config Data Return" register. Software (or the port hardware) may monitor this register and may wait for some number of additional Enhanced SKP OS with the same data in the data field across the multiple Enhanced SKP OSes for additional error protection.

FIGS. 11A-11C are flowcharts 1100a-c illustrating example techniques in connection with a link implemented using an extension device, such as a retimer. For example, in FIG. 11A, data may be accessed 1105 from a retimer access register at a first device (e.g., in the downstream port of a component). An ordered set can be generated 1110 with a subset of bits encoded to communicate a request involving a register of a retimer. The retimer can be used to lengthen a link between the first device and a second device. The subset of bits may be designated within the defined ordered set (or another frequently transmitted training sequence) for carrying data/addresses/commands from the first device to the retimer to allow access to registers of the retimer. A subsequent ordered set can be received 1115 that also includes a subset of bits that is encoded with data corresponding to a register of the retimer. The subset of bits in the subsequent ordered set can be encoded with data responsive to the request corresponding to the previous ordered set. The first device may encode data from the subsequent ordered set in a register at the first device to be accessed by system software or another system component.

In the example of FIG. 11B, a first ordered set can be received from a first device at a retimer extending a link connecting the first device and a second device. The first ordered set may include a subset of bits designated to communicate information concerning a register of the retimer. The subset of bits in the first ordered set may be decoded and an action performed 1125 at the retimer involving the retimer register based on the information included in the subset of bits. A second ordered set can be received 1130 at the retimer from the second device. The retimer can modify the second ordered set by encoding 1135 a designated subset of bits in the second ordered set with data responsive to the information encoded in the subset of bits of the first ordered set and corresponding to the performed action. The retimer can send 1140 the modified second ordered set to the first device.

In the example of FIG. 11C, system software (or another system component) can write 1150 request data to a first retimer access register at a first device. The first device may be connected to a second device over a link that includes the retimer. The first retimer access register can correspond to requests to be sent to the retimer to access a register of the retimer in bits set aside within a particular ordered set. The retimer can generate a response to send to the first device in response to the request, the response encoded in bits set aside within a particular ordered set. Data from the response can then be written to another register at the first device. System software can read 1155 the response data from the other register (e.g., in connection with configuration of the retimer specifically and/or the link generally), among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
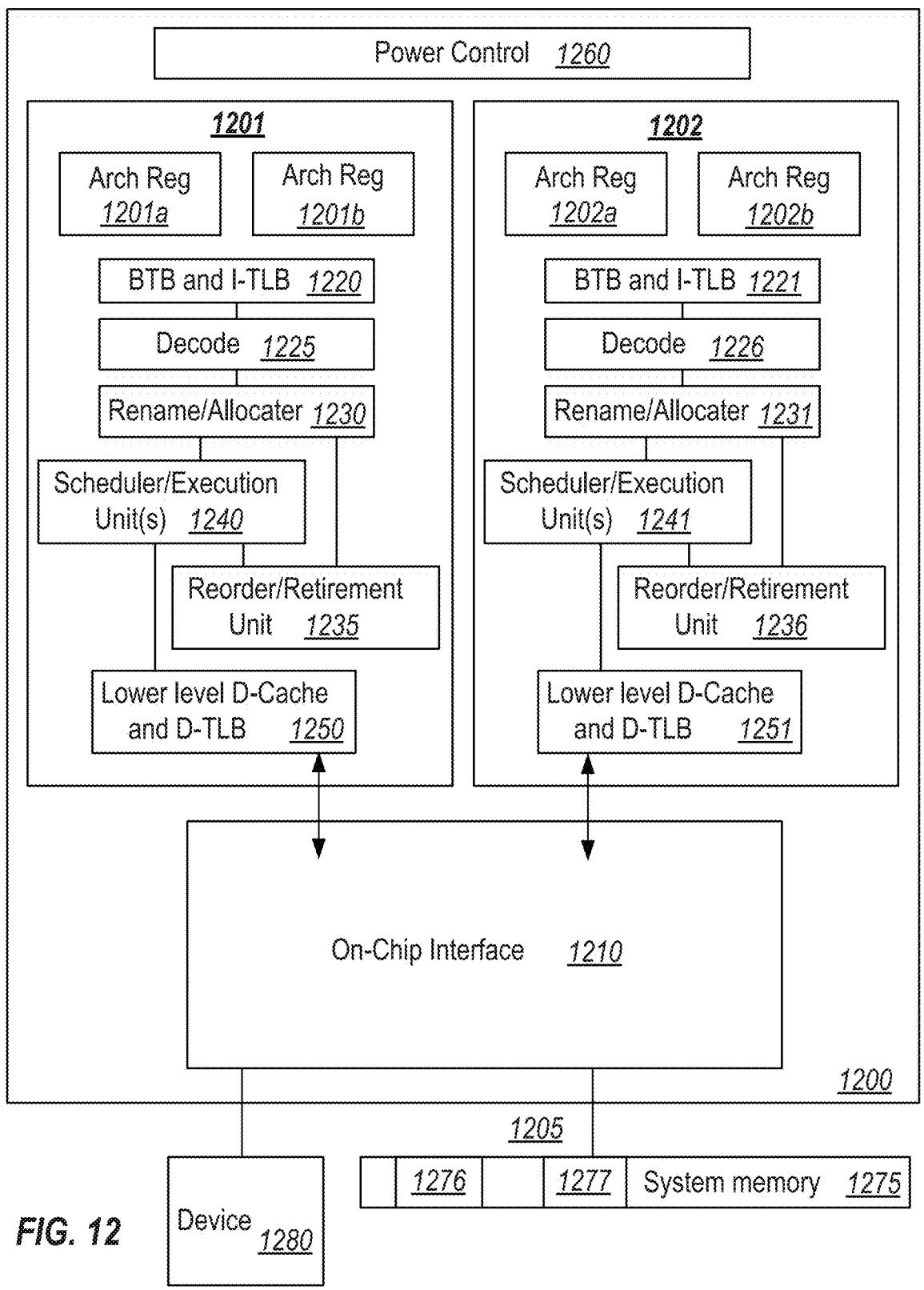
FIG. 12 illustrates an embodiment of a block diagram for a computing system including a multicore processor.

Referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1200, as illustrated in FIG. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201*a* and 1201*b*, which may also be referred to as hardware thread slots 1201*a* and 1201*b*. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201*a*, a second thread is associated with architecture state registers 1201*b*, a third thread may be associated with architecture state registers 1202*a*, and a fourth thread may be associated with architecture state registers 1202*b*. Here, each of the architecture state registers (1201*a*, 1201*b*, 1202*a*, and 1202*b*) may be referred to as processing elements, thread slots, or thread units, as described above. As illustrated, architecture state registers 1201*a* are replicated in architecture state registers 1201*b*, so individual architecture states/contexts are capable of being stored for logical processor 1201*a* and logical processor 1201*b*. In core 1201, other smaller resources, such as instruction pointers and renaming logic in allocator and renamer block 1230 may also be replicated for threads 1201*a* and 1201*b*. Some resources, such as re-order buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201*a*, 1201*b*, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201a and 1201b are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 1210 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
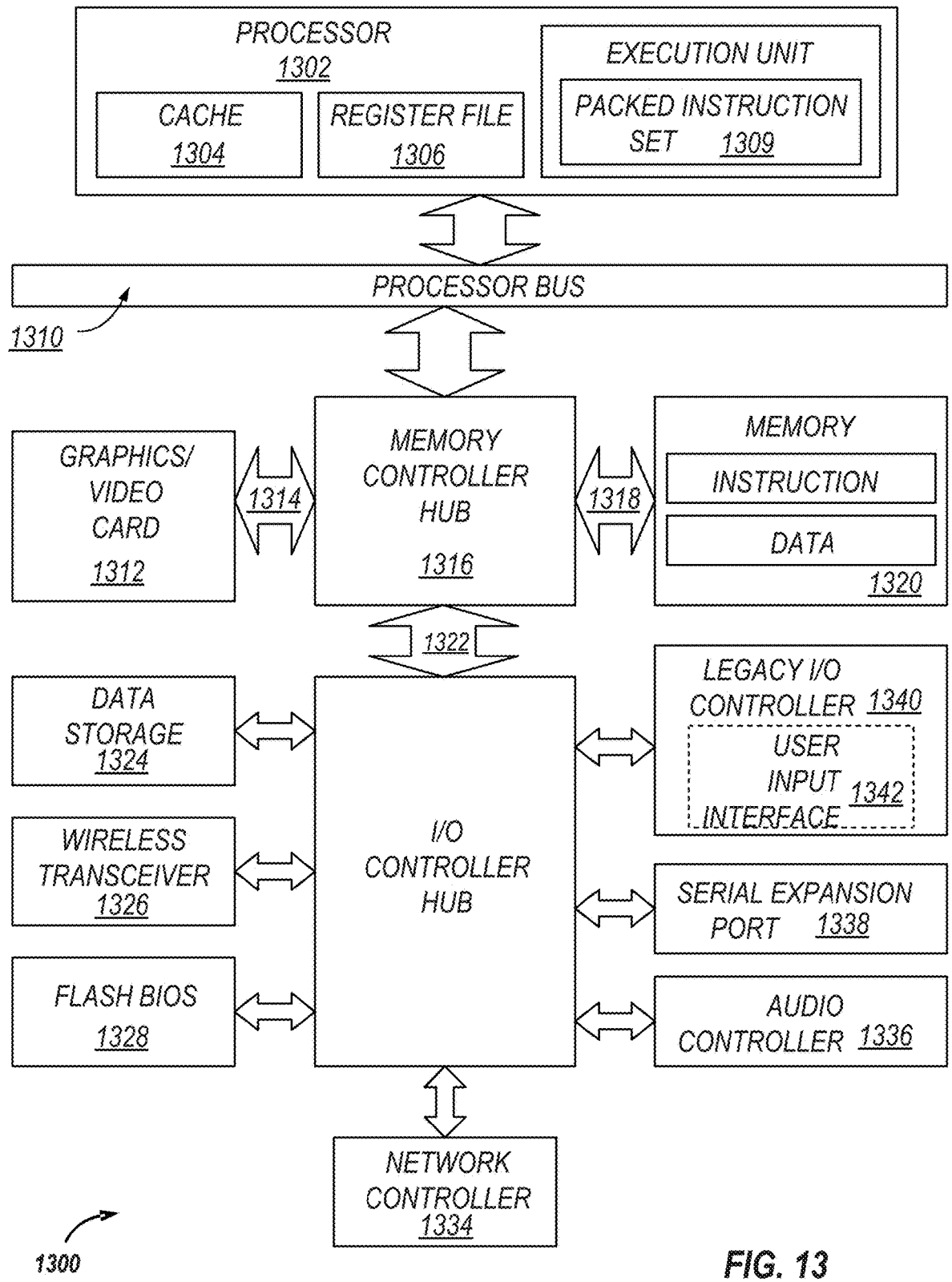
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present invention is illustrated. System 1300 includes a component, such as a processor 1302 to employ execution units including logic to perform algorithms for process data, in accordance with the present invention, such as in the embodiment described herein. System 1300 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the invention may be utilized on one or more interconnect illustrated in FIG. 13. For example, an on-die interconnect (ODI), which is not shown, for coupling internal units of processor 1302 implements one or more aspects of the invention described above. Or the invention is associated with a processor bus 1310 (e.g. other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
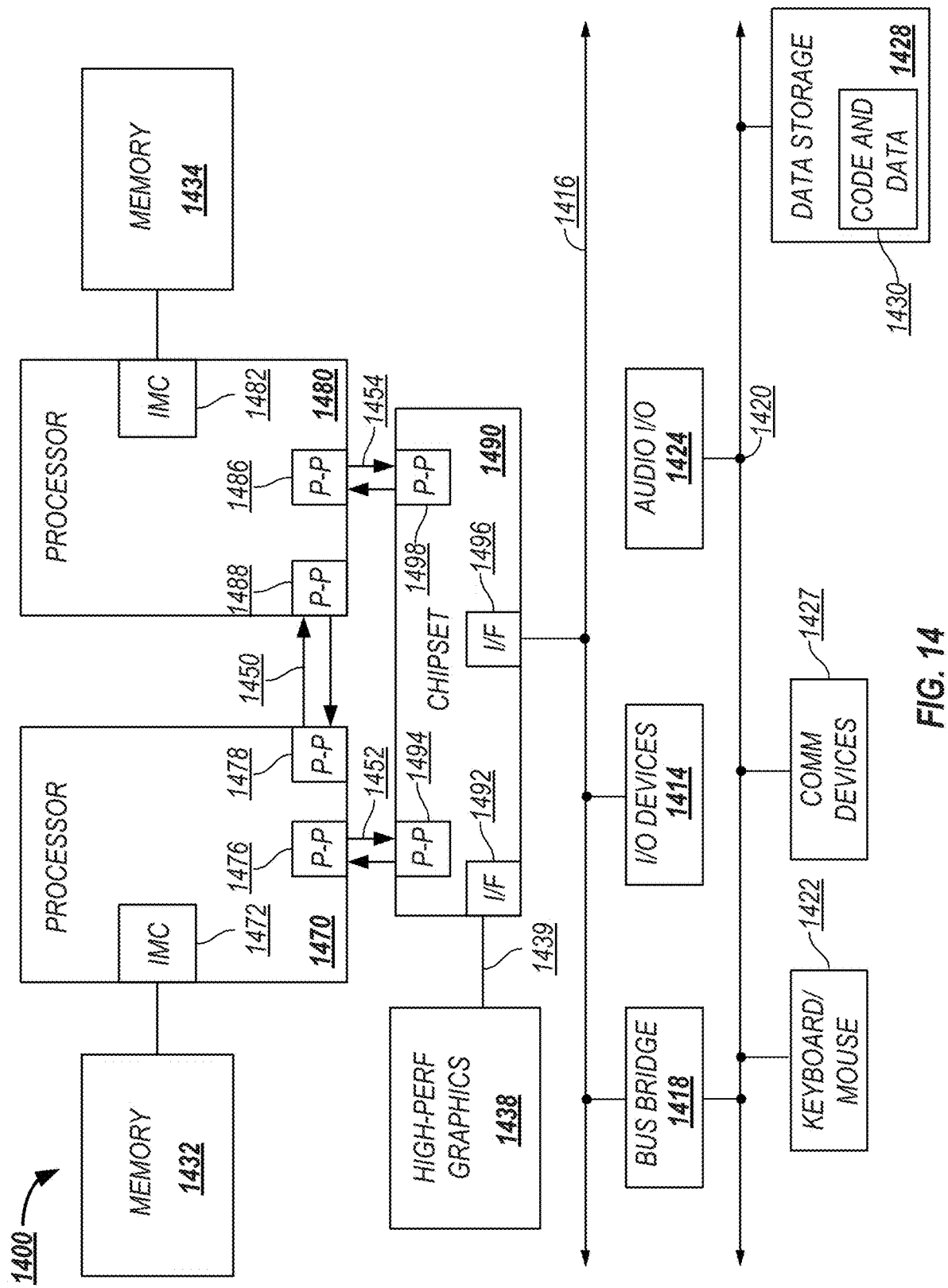
FIG. 14 illustrates an embodiment of a block for a computing system including multiple processors.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Figure 15:
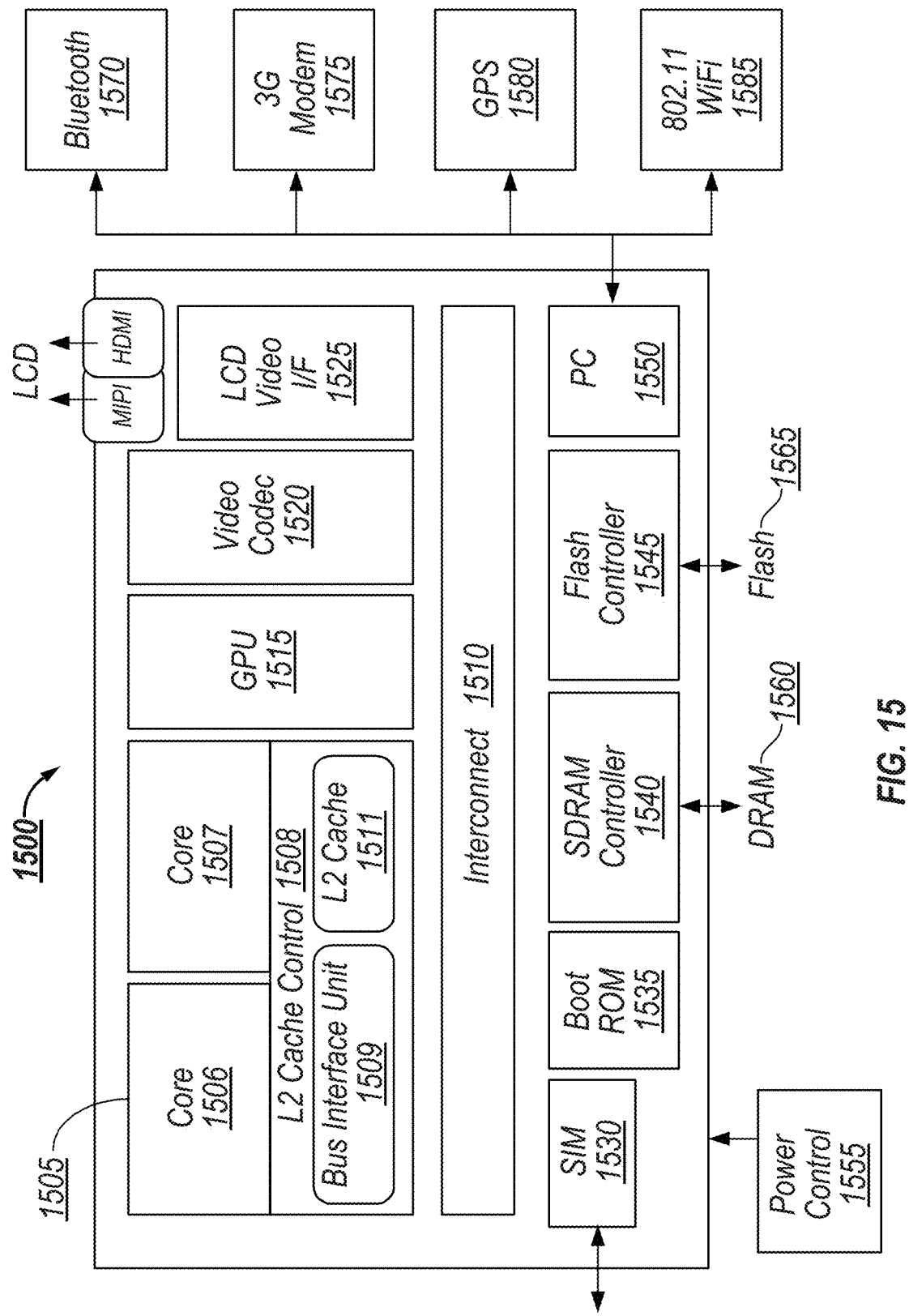
FIG. 15 illustrates an example system implemented as system on chip (SoC).

Turning next to FIG. 15, an embodiment of a system on-chip (SOC) design in accordance with the inventions is depicted. As a specific illustrative example, SOC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1500 includes 2 cores-1706 and 1507. Similar to the discussion above, cores 1506 and 1507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1511 to communicate with other parts of system 1500. Interconnect 1510 includes an on-chip interconnect, such as an IOSF, AMBA, or other interconnect discussed above, which potentially implements one or more aspects of described herein.

Interface 1510 provides communication channels to the other components, such as a Subscriber Identity Module (SIM) 1530 to interface with a SIM card, a boot rom 1535 to hold boot code for execution by cores 1506 and 1507 to initialize and boot SOC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the invention described herein.

In addition, the system illustrates peripherals for communication, such as a Bluetooth module 1570, 3G modem 1575, GPS 1585, and WiFi 1585. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 may provide a system, a machine readable storage, a machine readable medium, hardware- and/or software-based logic, a method, and an apparatus with memory to store a particular register of a first device, and physical layer logic implemented at least in part in hardware. The physical layer logic is executable or otherwise usable to access data from the particular register, where the first device is connected to a second device via a link, the link includes at least one retimer, the particular register corresponds to requests to be sent in in-band transactions with the retimer, and the data corresponds to a particular transaction with the retimer, and generate at least one ordered set to include a subset of bits encoded with the data, where the ordered set is to be sent on the link and the subset of bits are to be processed by the retimer in the particular transaction.

Example 2 may include the subject matter of example 1, where the particular transaction includes a request to read data from a register of the retimer and the request is generated from the data.

Example 3 may include the subject matter of any one of examples 1-2, where the particular transaction includes a request to write data to a register of the retimer and the request is generated from the data.

Example 4 may include the subject matter of any one of examples 1-3, where the link includes a plurality of retimers, the retimer includes a particular one of the plurality of retimers, and the subset of bits are further encoded to identify that the particular transaction is for the particular retimer.

Example 5 may include the subject matter of any one of examples 1-4, where the subset of bits includes reserved bits of the ordered set as defined according to a particular protocol.

Example 6 may include the subject matter of example 5, where the particular protocol includes a Peripheral Component Interconnect Express (PCIe)-based protocol and the ordered set is compliant with the PCIe-based protocol.

Example 7 may include the subject matter of any one of examples 5-6, where the ordered set includes a PCIe SKP ordered set.

Example 8 may include the subject matter of any one of examples 1-7, where the ordered set includes a first ordered set and the physical layer logic is further to receive a second ordered set generated by the second device, where the second ordered includes a subset of bits encoded by the retimer in response to the encoded subset of bits of the first ordered set.

Example 9 may include the subject matter of example 8, where the physical layer logic is to identify the second ordered set as an acknowledgement of the first ordered set in a handshake.

Example 10 may include the subject matter of any one of examples 8-9, where the subset of bits of the second ordered set are encoded with data corresponding to a response by the retimer in the particular transaction.

Example 11 may include the subject matter of example 10, where the particular transaction involves a read or write of a register of the retimer.

Example 12 may include the subject matter of any one of examples 10-11, where the particular register includes a first register, the memory further stores a second register, and the second register stores responses received from the retimer in the in-band transactions.

Example 13 may include the subject matter of example 12, where system software writes to the first register and reads from the second register.

Example 14 may include the subject matter of any one of examples 1-13, where the subset of bits include one or more error detection bits for use by the retimer in identifying a bit error in the subset of bits.

Example 15 may include the subject matter of example 14, where the error detection bits include a cyclic redundancy check (CRC) value.

Example 16 may include the subject matter of any one of examples 1-15, where the physical layer logic is to use the ordered set in training of the link unrelated to a register of the retimer.

Example 17 may provide a system, a machine readable storage, a machine readable medium, hardware- and/or software-based logic, a method, and an apparatus with a retimer including a configuration register and physical layer logic to receive a first ordered set from a first device including a subset of bits encoded with data to identify a command corresponding to the configuration register, decode the subset of bits, and perform an operation on the configuration register based on the command, where the retimer extends a channel connecting the first device to a second device.

Example 18 may include the subject matter of example 17, where the physical layer logic is further to generate result data corresponding to performance of the operation, receive a second ordered set from the second device, encode a subset of bits in the second ordered set with the result data, and send the second ordered set with the encoded subset of bits to the first device.

Example 19 may include the subject matter of any one of examples 17-18, where the retimer lacks link layer and transaction layer logic.

Example 20 may provide a system, a machine readable storage, a machine readable medium, hardware- and/or software-based logic executable to write data to a first register of a first device, where the first device is connected to a second device via a link, the link includes at least one retimer, the first register corresponds to a configuration register of the retimer, the data corresponds to a transaction to access the configuration register, a designated subset of bits in a first instance of an ordered set are to be encoded with the data, and the first instance of the ordered set with the encoded subset of bits is to be sent to the second device via the retimer, and read data from a second register of the first device, where the data includes data encoded by the retimer in a subset of bits in a second instance of the ordered set received at the first device.

Example 21 may provide a system with may provide a system with a retimer, a first device, and a second device connected to the first device by a link including the retimer. The second device may include physical layer logic, implemented at least in part in hardware, the physical layer logic to generate at least one ordered set to include a subset of bits encoded to indicate a request for the retimer, where the ordered set is to be sent on the link and another subset of bits of the ordered set is to be used by the first device in training of the link.

Example 22 may include the subject matter of example 21, where the second device further includes memory to store a register to provide data to embed in the ordered set.

Example 23 may include the subject matter of example 22, where the physical layer logic is further to receive a second ordered set generated by the first device, where the second ordered set includes a subset of bits encoded by the retimer in response to the encoded subset of bits of the first ordered set.

Example 24 may include the subject matter of example 23, where the register includes a first register and the memory further includes a second register to record the response of the retimer.

Example 25 may include the subject matter of example 24, further including system software to write to the first register and read from the second register.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a retimer comprising:
        a register;
        an upstream port to:
            receive a first instance of a SKP ordered set from a first device on a physical link, wherein the first instance of the SKP ordered set is defined according to a Peripheral Component Interconnect Express (PCIe)-based protocol and comprises one or more fields to identify a command and an identifier of the retimer, wherein the command comprises a request to access the register of the retimer;
        circuitry to:
            generate payload data comprising a register value from the register of the retimer based on the request to access the register of the retimer;
        wherein the upstream port is further to send a second instance of the SKP ordered set to the first device, wherein the second instance of the SKP ordered set comprises the payload data.

2. The apparatus of claim 1, wherein the upstream port comprises a receiver to receive the first instance of the SKP ordered set and further comprises a transmitter to send the second instance of the SKP ordered set.

3. The apparatus of claim 1, wherein the retimer further comprises a downstream port to connect to a second device on the link, wherein the link is to connect the first device to the second device, and the retimer is between the first device and second device on the link.

4. The apparatus of claim 3, wherein the downstream port is to:
    receive another instance of the SKP ordered set after receipt of the first instance of the SKP ordered set at the upstream port, and the second instance of the SKP ordered set is generated in response to receiving the other instance of the SKP ordered set.

5. The apparatus of claim 4, wherein the retimer further comprises retimer circuitry to regenerate data received on the upstream port for transmission on the downstream port and regenerate data received on the downstream port for transmission on the upstream port, wherein the upstream port regenerates the other instance of the SKP ordered set to add the payload data and thereby generate the second instance of the SKP ordered set.

6. The apparatus of claim 1, wherein the register comprises configuration information of the retimer.

7. The apparatus of claim 1, wherein the link comprises a plurality of retimers, the retimer comprises a particular one of the plurality of retimers, and the one or more fields comprises bits to identify which of the plurality of retimers the command is directed to.

8. The apparatus of claim 1, wherein the one or more fields comprise reserved fields of the SKP ordered set.

9. The apparatus of claim 1, wherein the first instance of the SKP ordered set comprises a cyclic redundancy check (CRC) value.

10. The apparatus of claim 9, wherein the retimer is further to check the CRC value.

11. The apparatus of claim 9, wherein the retimer is further compute a second CRC value for the second instance of the SKP ordered set, and the second instance of the SKP ordered set is generated to include the second CRC value.

12. The apparatus of claim 1, wherein the second instance of the SKP ordered set is generated to further comprise one or more fields to include the identifier of the retimer.

13. An apparatus comprising:
    a first device, wherein the first device comprises:
        a port to connect to a second device over a link, wherein the link comprises a retimer positioned between the first device and second device on the link, and the link is compliant with a Peripheral Component Interconnect Express (PCIe)-based protocol; and
        link training logic, comprising hardware circuitry, wherein the link training logic is to generate a first instance of a SKP ordered set formatted according to the PCIe-based protocol, wherein the first instance of the SKP ordered set is to comprise one or more fields to identify the retimer and a command for access to a register of the retimer,
    wherein the port comprises:
        a transmitter to send the first instance of the SKP ordered set on the link; and
        a receiver to receive a second instance of the SKP ordered set, wherein the second instance of the SKP ordered set comprises one or more fields encoded with a register value from the register of the retimer.

14. The apparatus of claim 13, wherein the second instance of the SKP ordered set originates from the second device and the register value is added to the one or more fields by the retimer.

15. The apparatus of claim 13, wherein the apparatus comprises a server system device.

16. The apparatus of claim 13, wherein the register of the retimer comprises configuration information of the retimer.

17. The apparatus of claim 13, wherein the one or more fields comprise reserved fields of the SKP ordered set as defined in the PCIe-based protocol.

18. The apparatus of claim 17, wherein the first instance of the SKP ordered set is sent and the second instance of the SKP ordered set is received during training of the link, wherein the link is to be trained based on the PCIe-based protocol.

19. A method comprising:
receiving, at a retimer device, a first instance of an ordered set from a first device on a link, wherein the first instance of the ordered set comprises one or more fields to identify a command and an identifier of the retimer device, the link is compliant with a Peripheral Component Interconnect Express (PCIe)-based protocol, the link connects the first device with a second device, and the retimer device is positioned between the first and second devices on the link;
determining, at the retimer device, from the one or more fields, that the first instance of the ordered set comprises the command, wherein the command comprises a command to access a register of the retimer device;
forwarding the first instance of the ordered set from the retimer device to the second device on the link;
generating payload data comprising a register value from the register;
receiving a second instance of the ordered set from the second device on the link; and
forwarding the second instance of the ordered set with the payload data from the retimer device to the first device as a response to the command, wherein the ordered set comprises a SKP ordered with fields defined according to the PCIe-based protocol.

20. The method of claim 19, wherein the register comprises configuration information of the retimer device.

21. The method of claim 19, wherein the first instance of the ordered set is sent and the second instance of the ordered set is received during training of the link, wherein the link is to be trained based on the PCIe-based protocol.

22. A system comprising:
a first device;
a retimer; and
a second device connected to the first device by a physical link, wherein the retimer is between the first and second devices on the link and is to extend the physical length of the link,
wherein the retimer comprises:
a register;
an upstream port to:
receive a first instance of an ordered set from the first device on the link, wherein the first instance of the ordered set comprises one or more fields to indicate an identifier of the retimer and identify that the first instance of the ordered set comprises a command to access the register of the retimer; and
register management logic to:
determine, from the one or more fields, that the ordered set comprises the command to access the register of the retimer;
generate payload data comprising a register value from the register;
wherein the upstream port is further to send a second instance of the ordered set to the first device on the link, wherein the second instance of the ordered set comprises the payload data as a response to the command, wherein the ordered set comprises a PCIe SKP ordered set and the one or more fields comprise fields of the PCIe SKP ordered set.

23. The system of claim 22, wherein the first device comprises a data processing apparatus and memory to store register information received in the register value of the second instance of the ordered set.

24. The system of claim 22, wherein the first device comprises a server socket.

25. The system of claim 22, wherein one or more of the first and second devices comprises a card device.

26. The system of claim 22, wherein the first device comprises:
a port to connect to the second device over the link; and
link training logic, comprising hardware circuitry, wherein the link training logic is to generate the first instance of the ordered set to comprise the one or more fields to identify the retimer and the command.

27. The system of claim 26, wherein the first device further comprises memory to store retimer register information comprising the register value as received in the second instance of the ordered set.

28. The system of claim 22, wherein the first device comprises:
a port to connect to the second device over the link; and
link training logic, comprising hardware circuitry, wherein the link training logic is to generate the instances of the ordered set to comprise the one or more fields.

29. The system of claim 22, wherein the register comprises configuration information of the retimer.

30. The system of claim 22, wherein the first instance of the ordered set is sent and the second instance of the ordered set is received during training of the link, wherein the link is to be trained based on a PCIe-based protocol.

31. The apparatus of claim 22, wherein the one or more fields are in symbols 4*N+2 and 4*N+3 defined in the PCIe SKP ordered set, where N is an integer number.

* * * * *